(12) United States Patent
Krüger

(10) Patent No.: US 7,277,535 B2
(45) Date of Patent: Oct. 2, 2007

(54) CONTROLLING CONNECTION PROCESSING

(75) Inventor: Andrei Krüger, Helsinki (FI)

(73) Assignee: Nokia Siemens Networks, Espoo (FI)

( * ) Notice: Subject to any disclaimer, the term of this patent is extended or adjusted under 35 U.S.C. 154(b) by 810 days.

(21) Appl. No.: 10/151,318

(22) Filed: May 21, 2002

(65) Prior Publication Data

US 2002/0172344 A1 Nov. 21, 2002

Related U.S. Application Data

(63) Continuation of application No. PCT/FI00/01051, filed on Nov. 30, 2000.

(30) Foreign Application Priority Data

Dec. 1, 1999 (FI) .................................. 19992579

(51) Int. Cl.
*H04M 7/00* (2006.01)
(52) U.S. Cl. .............................. 379/221.09; 379/221.08
(58) Field of Classification Search ........... 379/221.09, 379/201.03, 221.08, 201.02; 455/433
See application file for complete search history.

(56) References Cited

U.S. PATENT DOCUMENTS 5,526,413 A 6/1996 Cheston, III et al.
6,327,355 B1 * 12/2001 Britt ....................... 379/201.03
6,453,161 B1 * 9/2002 Touati et al. ................ 455/433
6,463,140 B2 * 10/2002 Tuunanen et al. ..... 379/201.02
6,760,425 B2 * 7/2004 Tuunanen .............. 379/221.08

FOREIGN PATENT DOCUMENTS

| EP | 0 830 039 | 3/1998 |
| EP | 0 899 970 | 3/1999 |
| WO | WO95/35632 | 12/1995 |

* cited by examiner

*Primary Examiner*—Ahmad F. Matar
*Assistant Examiner*—Thjuan K. Addy
(74) *Attorney, Agent, or Firm*—Pillsbury Winthrop Shaw Pittman LLP; Larry J. Hume

(57) ABSTRACT

A method, telecommunication system and a network node for controlling processing of a connection, particularly when information necessary for the controlling is available at an early stage. At least one processing instance is formed for the connection to control event processing of the control. The processing instance is also associated with a functional connection to at least one control function of the telecommunication system, the control function giving instructions related to processing the connection in response to requesting the instructions. In the processing instance are defined at least one interactive event of a delayed request, in which interactive event instructions from the processing instance are requested and, after requesting, processing the connection is continued, and at least one interactive event of a delayed response, in which interactive event the instructions requested in the interactive event of the delayed request from the control function are processed.

19 Claims, 2 Drawing Sheets

CONTROLLING CONNECTION PROCESSING

This application is a Continuation of International Application PCT/FI00/01051 filed 30 Nov. 2000 which designated the U.S. and was published under PCT Article 21(2) in English.

FIELD OF THE INVENTION

The invention relates to controlling connection processing of telecommunication networks when an entity responsible for the processing of a connection requests processing instructions from a control function. The invention relates particularly to controlling of the kind employed in an intelligent network.

BACKGROUND OF THE INVENTION

Facilities in telecommunication networks can be divided into three different levels of call processing: service level, call control level and switching level. The switching level serves to provide the physical connections (i.e. "media"). The call control level is responsible for routing a call to a correct destination and it controls the switching level. The service level serves to produce "supplementary services" of the subscriber and possibly also part of the basic service and controls the call control level. In the existing telecommunication networks, a typical facility comprising a "supplementary service" is conditional call forwarding which requires analysis of the call situation and forward routing of the call in accordance with the service profile of the stored call forwarding. Conventionally, the facilities have not been divided into different levels but the facilities have been an inseparable part of the basic network, in which case changing or adding facilities has required, for example, updating of software in all exchanges of the network.

An intelligent network IN is a network architecture to be attached to a basic network (a fixed network or a mobile network, for example) enabling a facility to be divided into a service level and into an entity comprising a switching level and call control level. This is carried out by transferring service control from the telephone exchange to a separate functional unit of the intelligent network. Hereinafter, this unit will be called a service control point SCP. Consequently, the services are made independent of the operation of the basic network without a need to change the structure and software of the basic network when services are changed or added. Network nodes responsible for intelligent network interfaces are called service switching points SSP. Typically, an SSP is a network node responsible for connection setup, an exchange of the basic network, for example.

In the intelligent network, call control is based on a processing instance of a call and on a triggering mechanism contained in the processing instance. In the service switching point SSP, the call processing instance is usually modelled by at least one logical state model. The reason why a call must be modelled is that for the SCP to be able to control call setup in the SSP, the SCP must know the phase of the call. In the state model, the call processing procedures carried out in the SSP are grouped in rough phases. By means of modelling, both the SSP and the SCP implicitly know detection points DP, i.e. the phases of the call and possible interaction points in which the SCP can affect the call. The triggering mechanism is based on detecting the detection points DP and triggers, or transmitting requests at the detection point from the SSP to the SCP after the triggering condition has been fulfilled. The triggering condition comprises one or more conditions. There are two types of triggers: R or "Request" and N or "Notification". When the SSP performs at the detection point DP an SCP request which is of the type R or "Request", the SSP transmits the request to the SCP and remains waiting for a response from the SCP. In connection with the "Notification" type, the SSP only transmits the notification requested by the SCP, charging information, for example, at the detection point and immediately continues with the call setup.

A problem of the system described above is that the SSP must interrupt call processing after having sent the request and wait for instructions from the SCP even when the requested information necessary for controlling the SCP are available at an early phase (in a setup message, such as IAM, for example) but the instructions are only needed at a later phase of the call setup. An example of this is to route the call to C subscriber when the number of B subscriber is busy. If the transmission path between the SSP and the SCP is slow or several instructions are being requested sequentially, call setup or continuing with the call is slowed down since it is necessary to wait for messages to travel between the SSP and the SCP and for the SCP to be processed.

BRIEF DESCRIPTION OF THE INVENTION

An object of the invention is to provide a method and an apparatus implementing the method so as to enable the above problems to be solved. The objects of the invention are achieved by a method of controlling processing of a connection in a telecommunication network, the method comprising the following steps: forming at least one processing instance for the connection by means of which event processing of the connection is controlled, the processing instance being associated with a functional connection to at least one control function of the telecommunication network, the control function giving instructions for processing the connection in response to requesting instructions; characterized by steps of: defining in the processing instance at least one interactive event of a delayed request in which instructions from the control function are requested and, after requesting, processing the connection is continued; and defining in the processing instance at least one interactive event of a delayed response in which the instructions requested from the control function in the interactive event of the delayed request are processed.

In the present application the concept "processing instance" covers a control record, corresponding entities and object classes, and it illustrates what may happen during the processing of a connection. Thus, a processing instance is not necessarily a process in the execution but it can also consist of information relating to a connection. For example, in the case of a GPRS connection a processing instance may be information produced in tabular form. The information and the processing instance may be related to a user, a packet data address, a PDP (Packet Data Protocol) context or an MM (Mobility Management) context.

In the present application the concept "interactive event" refers to a point in connection processing where a contact is made to a control function, or a response received from the control function is processed, or a contact is made and a response is waited for and processed. The invention further relates to a telecommunication system comprising at least one control function that gives instructions related to processing a connection; and at least one network node for processing the connection, the network node being arranged to form for the connection at least one processing instance that comprises at least two interactive events wherein the network node can interact with the control function. The telecommunication system is characterized in that at least one of the interactive events of the processing instance is the interactive event of a delayed request, and encountering the interactive event of the delayed request results in requesting instructions from the control function, and at least one of the interactive events of the processing instance is the interactive event of a delayed response, and encountering the interactive event of the delayed response results in processing the requested instructions in the interactive event of then delayed request, and the network node is arranged, in response to encountering the interactive event of the delayed request, to request instructions from the control function and, after requesting, to continue processing the connection.

The invention still further relates to a network node being responsible for processing a connection and being arranged to have a functional connection to a control function that gives instructions associated with processing the connection. The network node is characterized in that it is arranged to form for the connection at least one processing instance such that at least one of the events of the processing instance is defined as an interactive event of a delayed request, and encountering the interactive event of the delayed request results in transmitting a request for instructions to the control function and, after transmitting the request, continuing to process the connection, and that at least one of the events of the processing instance is defined an interactive event of a delayed response, and encountering the interactive event of the delayed response results in processing the requested instructions in the interactive event of the delayed request.

The invention is based on the idea that requesting instructions and processing instructions are distributed to two separate detection points such that at a first detection point necessary information, such as the number of A subscriber, is transmitted to the control and instructions are requested for further processing, and at a second detection point the instructions for further processing are processed. This is carried out by indicating in the triggering information of the request for instructions whether it is necessary to wait for the instructions at the detection point or whether it is possible to continue processing the connection. In other words, new trigger types are defined: requesting delayed instructions and processing delayed instructions. An advantage of the invention is that it enables parallel processing between the controlling entity and the controlled, i.e. requesting, entity. Hence, call setup, for example, becomes faster. In addition, production of some services may become easier by parallel processing.

In a preferred embodiment of the invention, received instructions are buffered to wait for processing. A further advantage of this embodiment is that the control function does not need to know when the instructions are needed but it can transmit them immediately. It is thus not necessary to change the control function. A still further advantage is that the processing becomes even faster when the instructions are available once they are needed.

The preferred embodiments of the method, telecommunication system and network node of the invention are disclosed in the dependent claims.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

Figure 1:
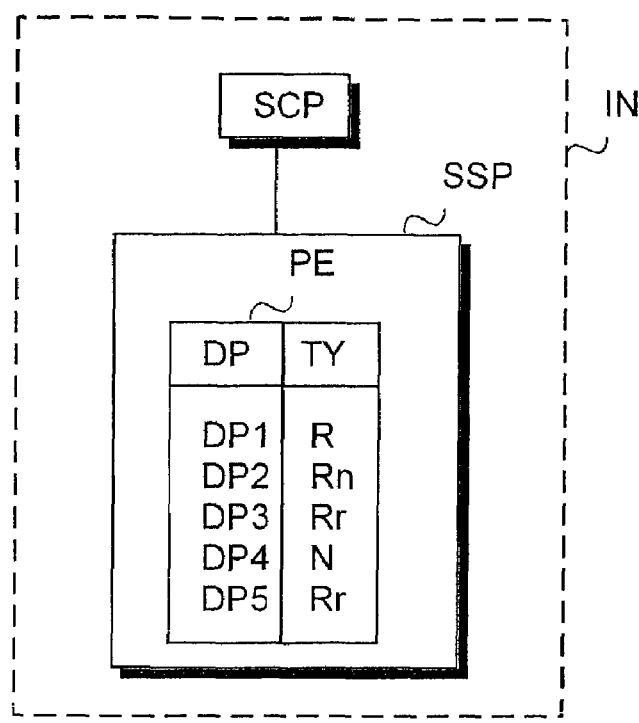
FIG. 1 is a block diagram of the essential elements of a system according to a first preferred embodiment of the invention.

The invention and its background will be described in the following using the terminology of the ETS 3000 374-1 CoreINAP and the existing structure of an intelligent network without restricting the invention to such specific solution. The invention can also be used in intelligent networks or execution platforms of the intelligent network kind implemented according to other intelligent network standards (such as ANSI, AIN, WIN or CAMEL) where some other than an intelligent network protocol is used for data transmission. Execution platforms of the intelligent network kind include platforms that employ control principles of an intelligent network. In the present application, the control principles of the intelligent network refer to a contact made to a control function on the basis of triggering information and to controlling a connection by means of a processing instance. The processing instance can be modelled by a state model. An entity to be controlled can also operate only on external impulses wherefrom triggers are carried out, in which case a state model is not necessarily needed. In principle, these execution platforms only differ from the intelligent network in that no IN protocol is used between the SCP and SSP, for example, but an IP protocol, for example, is used instead. In addition, they may differ with respect to the impulse leading to triggering: in the intelligent network, triggering takes place when a certain phase of a call is reached, but in other protocols triggering can be generated by an external or internal impulse. The invention can also be applied to call control protocols such as Parlay Application Protocol Interface (API) or Open System Architecture (OSA) being developed.

In the present application, the intelligent network generally refers to a solution wherein a node transmitting a call, session or packet data contacts a control function of a service which gives the node instructions affecting the transmission of the call, session or packet data. Making a contact from said node to the control function of a service is based on the node's triggering data on the service. Triggering data can be added and/or deleted at the request of an external service in the midst of call setup or even before the call setup is initiated. Characteristic features of an intelligent network include triggers, state models and controlling protocols or an application protocol interface (API) between a control function and a network connection node. A call, session or transmission of packet data can be depicted to the control function by a visible state model comprising phases and detection points attached thereto wherein the processing can be stopped until instructions are received from the control function. In other words the state model is used to model the processing instance. Controlling and operations can also be methods directed at call entities and event notifications related thereto. In the present application the term call, besides referring to a common call, also refers to other, possibly virtual, connection states whereto user data transmission is associated, such as data session or packet data transmission. Examples include a packet radio session (such as a GPRS session), voice IP (VoIP) session and multimedia session according to H.323.

A telecommunication system implementing the functionality of the present invention comprises, in addition to prior art equipment necessary for implementing control requested by triggering, equipment for maintaining data related to delayed instructions. Data associated with delayed instructions indicate that, for example, processing the connection can be continued after transmitting a request for instructions. The data also indicates, directly or indirectly, the point or points wherein the delayed instructions are needed. The existing network nodes comprise processors and memory that can be utilized in functions according to the invention. All changes necessitated by the invention can be implemented by added or updated software routines and/or application circuits (ASIC).

FIG. 1 shows an intelligent network IN architecture at a general level since the structure of the network is not relevant to the invention. The intelligent network is attached to a telecommunication system such that a service switching point SSP of the intelligent network is also the exchange or a corresponding network node of the telecommunication system. The example in FIG. 1 does not show the actual functions of the intelligent network but they are shown in connection with a network node containing the function. The essential point in view of the invention is, however, the function, not the network node to which the function is situated by way of example.

A network node that comprises a service switching function SSF and a call control function CCF is a called a service switching point SSP. The call control function CCF is not a function associated with the intelligent network but a standard function at exchanges which comprises high-level call processing functions of an exchange, such as establishing and releasing connection paths. The service switching function SSF is an interface between the call control function CCF and the call control function SCF. The SSF interprets the requests transmitted by the SCF and relays them to the CCF, which starts the call control function required by the requests. Similarly, the call control function CCF utilizes the SSF to request instructions from the SCF. The SSF is fixedly connected to the CCF, and the CCF acts as the interface thereof. Hence, each SSF communicates with the CCF in the same exchange. Within the scope of the present application, the service switching point SSP is equal with a functional whole formed by the CCF and the SSF, and the term SSP will be used hereinafter. The service switching point SSP may also include a call control agent function CCAF establishing access for users to the network. Typically, the service switching point SSP is an exchange which implements the service switching function, i.e. identifies the service and initiates interworking, but the SSP may also be a network node of another kind or a call processing server, such as a node responsible for VoIP connection setup, H.323 gatekeeper or a session initiation protocol SIP Proxy, for example. Hence, the SSP is only one example of an entity requesting control data.

In a first preferred embodiment shown by FIG. 1, in a requesting entity SSP at least one separate processing instance PI is formed for each call, the PI being responsible for the processing and interworking of the call in question together with the controlling entity, i.e. in the example of FIG. 1, the SCP. Processing instances are usually modelled by a state model. Each processing instance PI comprises detection points DP and associated triggering data, such as triggering conditions, for example. The triggering data comprises data TY about what kind of trigger is in question. In the first preferred embodiment, the data TY is given as the type of the trigger. A trigger can be of the type R, i.e. "Request", N, i.e. "Notification", delayed request Rn, i.e. "Request Notification", or delayed response Rr, i.e. "Request Response". Hereinafter, the type Rn is also called delayed request and the type Rr delayed response. The way in which triggers differ from each other is described in connection with FIG. 2. The data can also be given in some other way, such that data indicating that this request is only transmitted when request notification is needed is associated with a specific request, for example. The detection points DP are either static, i.e. subscriber- or exchange-specific, or dynamic, i.e. the SCP gives the SSP instructions to arm the detection points. In call control protocols being developed, such as Parlay API, some detection points can be set dynamically before the initiation of a call. Similarly, triggering data or part of it, such as data TY about the kind of trigger that is in question, is either static (requesting entity or subscriber-specific) or dynamic (obtained from the controlling entity). In the first preferred embodiment, for the sake of clarity it is assumed that only one trigger is associated with each detection point and thus only one type of trigger. In the other preferred embodiments of the invention, several triggers possibly of different kinds can be associated with the detection points. In the first preferred embodiment, detection points where a response is needed are defined for the static triggers of the delayed request type. There must be at least one such detection point. By means of this information, the detection point of the delayed response can be obtained for the processing instance PI in the first preferred embodiment. Naturally, the detection points of the delayed response are points subsequent to the detection point of the delayed request. In the first preferred embodiment, the dynamically armed trigger types are obtained when the controlling entity SCP transmits instructions comprising the types to the requesting entity SSP. The SCP preferably transmits the dynamic trigger types simultaneously with transmission of the data about the dynamic detection points. As a new parameter, the instructions include for each type of the delayed request one or more detection points which, when encountered, necessitate a delayed response. After receiving the instructions the SSP arms the dynamic triggers.

A network node that comprises a service control function SCF is called a service control point SCP. Within the scope of the present application, the service control function also refers to different application servers. The control function can also be located in the same network node as the switching function, in which case the controlling is internal controlling of the node. The service control function comprises all service logic and control associated with the service (for example, the necessary database and service logic programs SLP, i.e. computer programs that implement the logical structure of a certain service). The service control function can be a mere logical function that can be seen uniform in view of the service switching point SSP. Internally, it can be implemented in different ways, it can be internally distributed and the associated service logic can be distributed to different nodes. Also the service data can be distributed to different network nodes than the service logic. For example, the service control function or service control point (SCF/SCP) may be internally distributed such that it provides an external server provided by a provider of an external service only with an open interface (a common object request broker architecture CORBA, for example). The SCP and the external server thus combine to form the service control function. Within the scope of the present application, the SCF and the SCP are equal; hereinafter, the term SCP will be used.

Functions of the intelligent network that are not shown in FIG. 1 include, for example, a service data function SDF, specialised resource function SRF and service management function SMF. The SDF is a database used by the SCF. Service logic programs can inquire and update the data located in the SDF. Subscriber-specific or service-number-specific data, for example, can be stored in the SDF. The SDF can be either a management system of the database in the service control point SCP or it can be a separate database point. By means of the SMF, data associated with the users and the network is managed in the database, including service-specific data and service programs. The SRF is an interface for network mechanisms that are associated with the interaction with the subscriber. The SRF can be associated with intelligent peripherals IP that comprise more advanced speech processing functions than the exchanges or the SRF can be located at the service switching point SSP. In addition, intelligent network services are developed, tested and deleted by specific equipment called service creation environment (SCEP).

Figure 2:
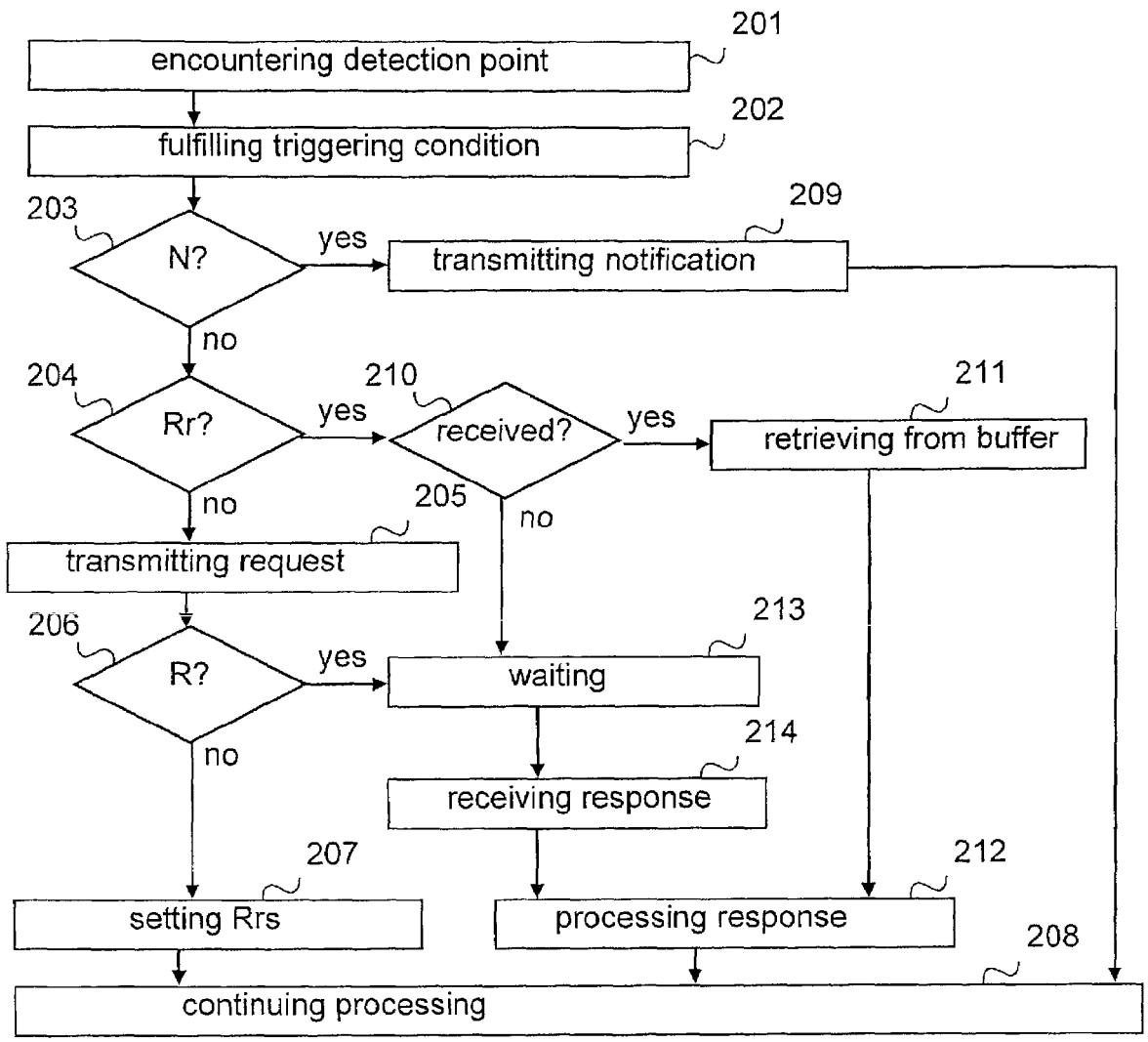
FIG. 2 is a flow diagram of the operation in accordance with the first preferred embodiment of the invention at a detection point.

FIG. 2 shows the operation in accordance with the first preferred embodiment of the invention at a requesting entity (the SSP, for example) when a detection point is encountered. A detection point refers to a point of event processing of a connection which allows, when the triggering conditions are fulfilled, interaction with a control function, i.e. a controlling entity. For the sake of clarity, it is assumed in FIG. 2 that the triggering conditions are met and instructions are received from the controlling entity (the SCP, for example). It is further assumed that the transmitting a request or notification includes transmitting necessary data to the control function. In the first preferred embodiment of the invention it is assumed that the detection point only comprises one trigger whose type needs to be found out. FIG. 2 shows, however, an example of the order in which different triggers can be processed in those embodiments wherein one detection point can comprise several triggers. Also another order and/or parallel processing can be used.

Referring to FIG. 2, at point 201 a detection point is encountered and at point 202 it is noted that the triggering condition is fulfilled. The type of trigger is found out by means of points 203, 204 and 206. At point 203 it is checked whether the trigger is a notification N. If not, it is checked at point 204 whether the trigger is a delayed response Rr. If not, the trigger includes transmitting a request to the control function. The request is then transmitted at point 205, whereafter it is checked at point 206 whether the trigger of the request is of the type R. If not, the trigger is a delayed request Rn, and consequently, corresponding Rrs are set at point 207. In other words, data indicating that a delayed response Rr is needed is set at those detection points where instructions requested at point 205 are needed. The data is set on the basis of the triggering data. Next, at point 208, call processing is continued. In the first preferred embodiment, a transfer takes place from the detection point to the next phase of the call processing or the next detection point. In other words, the facility for which the level of the requesting entity is continued in the first preferred embodiment. Naturally, to continue with the process requires that the requesting entity (i.e. the SSP) is able to continue the process without having external instructions in the first place.

If the trigger is a notification N (point 203), the notification is transmitted at point 209 and the call processing continues at point 208.

If the trigger is a trigger of a delayed response Rr (point 204), it is checked at point 210 whether the response has been received. In the first preferred embodiment of the invention, the delayed response is buffered before encountering the detection point if the response is received during the call processing. It is not advantageous to start processing the response before encountering the detection point since if the detection point is not encountered at all, this means unnecessary work. In addition, some facilities can be left unperformed if the response is processed earlier. If a response is already received (point 210), it is retrieved from a buffer at point 211 and processed at point 212. After the response is processed, call processing is continued at point 208 according to the instructions obtained with the response. If no response has been received yet (210), the process waits at point 213 until the response is received at point 214. The waiting time of the response preferably follows the time limits according to the protocol or implementation used. If the time limit is exceeded, the process follows the manner of operation defined by the protocol or implementation. Usually a fault is then detected. In the example of FIG. 2, the response is received in time, however, so after the response is received the process moves to point 212 to process the response.

If the trigger of the transmitted request is a request R (point 206), the process waits at point 213 until the response is received at point 214. Preferably, the waiting time is the same as the waiting time of the delayed response, but the waiting times can also differ from each other.

In the embodiments of the invention wherein there can be several triggers at the same detection point the continuing of the process (point 208) comprises processing the next triggers located at the same detection point before the facility is continued. In other words, in these embodiments, points 202 to 214 are repeated until all triggers of the detection point are processed and only after that does the process exit from the detection point. If a detection point comprises triggers of different type, it is preferable to process first notifications N that do not usually affect other triggers. Next, it is preferable to process the delayed response Rr since it usually contains data necessary for the other triggers. If there are several triggers of the delayed response in the detection point, it is preferable to process them in the order of corresponding delayed requests. After processing the delayed response it is preferable to transmit requests of the type R since it is possible to transmit the delayed requests Rn during the time when the controlling entity, i.e. the control function (SCP), processes the requests. Also another order can be followed and every detection point can have a unique order. In addition, the order can be static or dynamic.

In a second preferred embodiment of the invention, wherein the corresponding Rrs are set simultaneously with arming the triggers Rn, point 207 is ignored.

The order of the points shown in FIG. 2 can deviate from the one described above and the points can occur concurrently. For example, point 206 can be carried out before point 205, whereby the request transmitted at point 205 can be different depending on whether the trigger is R or Rn. Between the points, other points can be carried out that are not shown in the figures and some points shown in the figures can also be left out. For example, in embodiments wherein a maximum time has been defined for a waiting time of the response, the waiting time starting from the transmission of the delayed request, it can be checked whether the maximum time has been exceed after noting that no response has been received, and if the time is exceeded, a fault is detected. Points 210 and 211 are ignored in embodiments wherein the control function, i.e. the SCP, buffers either the instructions or the request, and the trigger of the delayed response includes requesting instructions from the SCP; instead, before point 213 (waiting) a call for instructions is transmitted, i.e. it is indicated that the instructions requested earlier are needed now.

Figure 3:
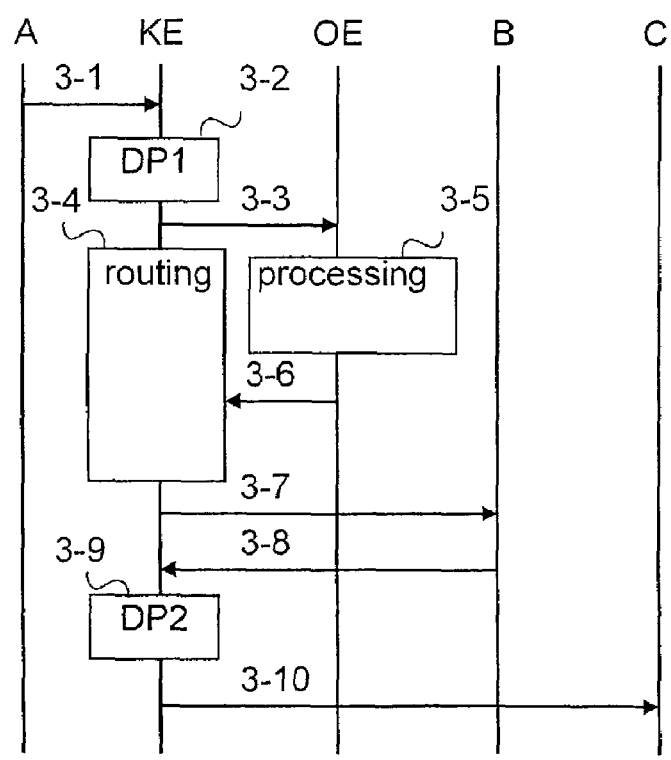
FIG. 3 shows the signalling of an exemplary service in the first preferred embodiment of the invention.

FIG. 3 shows signalling according to the first preferred embodiment of the invention by means of an example service. As the example service in FIG. 3 is a service provisioned by a caller, i.e. subscriber A, in which service calls made to the number of subscriber (or subscribers) B are routed to an operator, i.e. subscriber C, when the telephone of the subscriber B is busy. The detection points necessary for this service and the types of triggers are defined statically. The numberings of the detection point used in FIG. 3 are only used to distinguish the detection points from each other; hence, they do not refer to the identification numbers of the detection points defined in the intelligent network standards.

In FIG. 3, caller A selects number B of subscriber B, the number being transmitted in message 3-1 to an entity that is responsible for processing the call, i.e. to a requesting entity KE, which in the first preferred embodiment is the SSP. When the requesting entity KE has received number B, it encounters detection point DP1 at point 3-2. In other words it detected that the selection of subscriber A includes something that might necessitate instructions from the controlling entity (i.e. the SCP). On the basis of the triggering data the requesting entity KE detects that the trigger is a delayed request whose response is needed at detection point DP2. In the first preferred embodiment, the requesting entity sets, at point 3-2, information indicating the existence of Rr to the triggering data of detection point DP2 (the information is obtained from the triggering data of DP1). The requesting entity KE transmits the request to the controlling entity OE in message 3-3, which is preferably the same message that is used for the requests of the type R. The controlling entity does not need to know anything about the type of the request. After transmitting request 3-3, the requesting entity starts routing the call toward subscriber B at point 3-4.

After receiving the request 3-3, the controlling entity starts analyzing the request at point 3-5. In the present example, the request included the number of subscriber B which needs to be given the number of subscriber C as redundant routing instructions. When the controlling entity finds out the number of subscriber C, it returns the number of subscriber C to the requesting entity in message 3-6. Message 3-6 is preferably the same message that is used also when a request of the type R is responded to. The requesting entity KE receives message 3-6 but does not process it but buffers it. The KE is able to combine the received message on the basis of the connection identifier and it identifies the message as the message of the delayed response.

When the requesting entity has completed the routing, it routes the call to subscriber B in message 3-7 from whom busy-message 3-8 is received. In the requesting entity, detection point "busy", i.e. detection point DP2, is encountered at point 3-9. The requesting entity knows that it receives instructions from the controlling entity at detection point DP2. In the example shown in FIG. 3, the instructions are already received, so it is possible to start processing them at point 3-9 immediately. When the requesting entity KE has found out the number of subscriber C, it routes the call in message 3-10 to subscriber C according to the instructions received from the controlling entity.

If the telephone of subscriber B is would not have been busy, detection point DP2 would not have been encountered and the number of subscriber C would have been unnecessary. When, in accordance with the invention, the number of subscriber C is not processed until at detection point DP2, unnecessary processing is avoided and capacity of the requesting entity is thus saved. Transmitting the request already at an early stage has the advantage that the data is in practice immediately available at detection point DP2, in other words when it is needed. This makes the call setup faster.

In another preferred embodiment of the invention wherein the SCP buffers the instructions, the buffering takes place at point 3-5 after the processing. Message 3-6 is not transmitted until the requesting entity at point 3-9 transmits a call for instructions to the controlling entity. The call for instructions can be a message of the notification type, for example.

In another preferred embodiment of the invention wherein the SCP buffers the contents of the request, i.e. message 3-3, only buffering takes place at point 3-5. The actual analysis of the request and transmission of the instructions in message 3-6 do not take place until the requesting entity transmits a call for instructions to the controlling entity at point 3-9. In the present embodiment, message 3-3 can be of the notification type, for example, and the call for instructions can be a trigger of the type R, for example.

The signalling messages disclosed above in connection with FIG. 3 are only suggestive and they may contain further information. The messages can also be combined freely. Depending on the operators and the system, also other entities whereto different functions have been distributed can participate in transmitting the information and signalling. Messages 3-3 and 3-6 can also be different that messages used for the type R. In embodiments wherein the controlling entity buffers either the request or the instructions, a way to indicate the delayed request to the controlling entity is that message 3-3 is different from the message used for the type R. Other indication ways include, for example, using different parameters in the messages. The word "message" used above in connection with FIG. 3 should rather be interpreted in a broad sense to refer to a means for transmitting data. For example, intelligent networks conventionally use the word "operation". In internal and/or distributed implementations (implementations of the CORBA type, for example) the requester, the requesting entity, for example, neither transmits nor receives messages but carries out routine calls. They all can, however, be equated with the messages of FIG. 3.

Although the invention has been described above by using an intelligent network and SSP-SCP interface as an example, the invention is not, however, restricted to intelligent networks and said interface. The SSP-SCP interface disclosed above is one example of an interface between a service level and a call control level. Similar interfaces can also be found in other application of the intelligent network kind, i.e. in applications wherein controlling is separated from actual processing. In the future, similar interfaces will also be found between the call control level and the switching level. Hence, the call control level has a controlling entity and the switching level has a requesting entity. It is obvious to those skilled in the art how the invention is applied to all interfaces based on controlling and triggers by means of which a lower level can request further instructions from a higher level regardless of where the interface is located and regardless of how further instructions are requested and received.

It is to be understood that the above description and the related figures are only intended to illustrate the present invention. It will be obvious to those skilled in the art that the invention can be varied and modified in many ways without departing from the scope and spirit of the invention disclosed in the attached claims.

What is claimed is:

1. A method of controlling processing of a connection in a telecommunication network, the method comprising:
    forming at least one processing instance for the connection by means of which event processing of the connection is controlled, the processing instance being associated with a functional connection to at least one control function of the telecommunication network, the control function giving instructions for processing the connection in response to requesting instructions;
    defining in the processing instance at least one interactive event of a delayed request in which instructions are requested from the control function and, after requesting, the processing of the connection is continued without waiting for the instructions; and
    defining in the processing instance at least one interactive event of a delayed response in which the instructions requested from the control function in the interactive event of the delayed request are processed.

2. The method of claim 1, further comprising:
    receiving the instructions before the interactive event of the delayed response; and
    buffering the instructions.

3. The method of claim 1, further comprising:
    encountering the interactive event of the delayed response;
    checking whether the instructions have been received, and
    if so, processing the instructions;
    if not, waiting for the instructions.

4. The method of claim 1, further comprising modelling the processing instance by a state model that comprises detection points for interactive events, in which detection points it is possible to contact the control function and in which detection points interaction with the control function is based on triggering information available to the processing instance.

5. The method of claim 4, wherein each detection point of the interactive event of the delayed response is a later detection point than a detection point of an interactive event of a corresponding delayed request.

6. The method of claim 4, wherein if the interactive event is the interactive event of the delayed request or the delayed response, this is indicated in the triggering information of the detection point.

7. The method of claim 1, wherein the telecommunication system utilizes an intelligent network, the processing instance is the processing instance of the service switching function of the intelligent network and the control function is the service control function of the intelligent network.

8. A telecommunication system comprising
    at least one control function that gives instructions related to processing a connection;
    at least one network node for processing the connection, the network node being arranged to form for the connection at least one processing instance that comprises at least two interactive events wherein the network node can interact with the control function,
    wherein at least one of the interactive events of the processing instance is the interactive event of a delayed request, and encountering the interactive event of the delayed request results in requesting instructions from the control function, and at least one of the interactive events of the processing instance is the interactive event of a delayed response, and encountering the interactive event of the delayed response results in processing the requested instructions in the interactive event of the delayed request, and
    the network node is arranged, in response to encountering the interactive event of the delayed request, to request instructions from the control function and, after requesting, to continue processing the connection without waiting for the instructions.

9. The telecommunication system of claim 8, wherein
    the control function is arranged, in response to requesting instructions, to analyze the request and transmit the instructions to the network node; and
    the network node is arranged, in response to receiving instructions, to buffer the instructions if the interactive event of the delayed request has not been encountered.

10. The telecommunication system of claim 8, wherein the network node is arranged, in response to encountering the interactive event of the delayed request, to wait for instructions if no instructions have been received from the control function.

11. The telecommunication system of claim 8, wherein
    the network node is arranged to indicate to the control function that the request for instructions is a delayed request, and in response to encountering the interactive event of the delayed response, to transmit a call for instructions to the control function, and
    the control function is arranged, in response to the delayed request, to buffer the request and in response to the call for instructions, to analyze the request and transmit the instructions to the network node.

12. The telecommunication system of claim 8, wherein
    the network node is arranged to indicate to the control function that the request for instructions is a delayed request, and in response to encountering the interactive event of the delayed response, to transmit a call for instructions to the control function, and
    the control function is arranged, in response to the delayed request, to analyze the request and buffer the instructions, and in response to the call for instructions, to transmit the instructions to the network node.

13. The telecommunication system of claim 8, wherein the telecommunication system is arranged to utilize the control principles of the intelligent network between the network node and the control function.

14. The telecommunication system of claim 13, wherein the control function corresponds to a service control function of the intelligent network and the network node corresponds to a service switching function of the intelligent network.

15. A network node of a telecommunication system, the network node being responsible for processing a connection and being arranged to have a functional connection to a control function that gives instructions associated with processing the connection,
    the network node being arranged to form for the connection at least one processing instance such that at least one of the events of the processing instance is defined as an interactive event of a delayed request, and encountering the interactive event of the delayed request results in transmitting a request for instructions to the control function and, after transmitting the request, continuing to process the connection without waiting for the instructions, and that at least one of the events of the processing instance is defined an interactive event of a delayed response, and encountering the interactive event of the delayed response results in processing the requested instructions in the interactive event of the delayed request.

16. The network node of claim 15, being further arranged to buffer the instructions in response to receiving the instructions if the interactive event of the delayed request has not been encountered.

17. The network node of claim 15, being further arranged, in response to encountering the interactive event of the delayed request, to wait for instructions if no instructions have been received from the control function.

18. The network node of claim 15, being further arranged to model the processing instance by a state model which comprises detection points, at which detection points it is possible to interact with the control function and in which detection points interaction with the control function is based on triggering information available to the processing instance.

19. The network node of claim 18, wherein the interactive event of the delayed request is the trigger of a first detection point and the interactive event of the delayed response is the trigger of a second detection point.

* * * * *